Nov. 8, 1955     H. O. HEDGES     2,722,924
INTERNAL COMBUSTION ENGINE
Filed Feb. 17, 1951     4 Sheets-Sheet 1
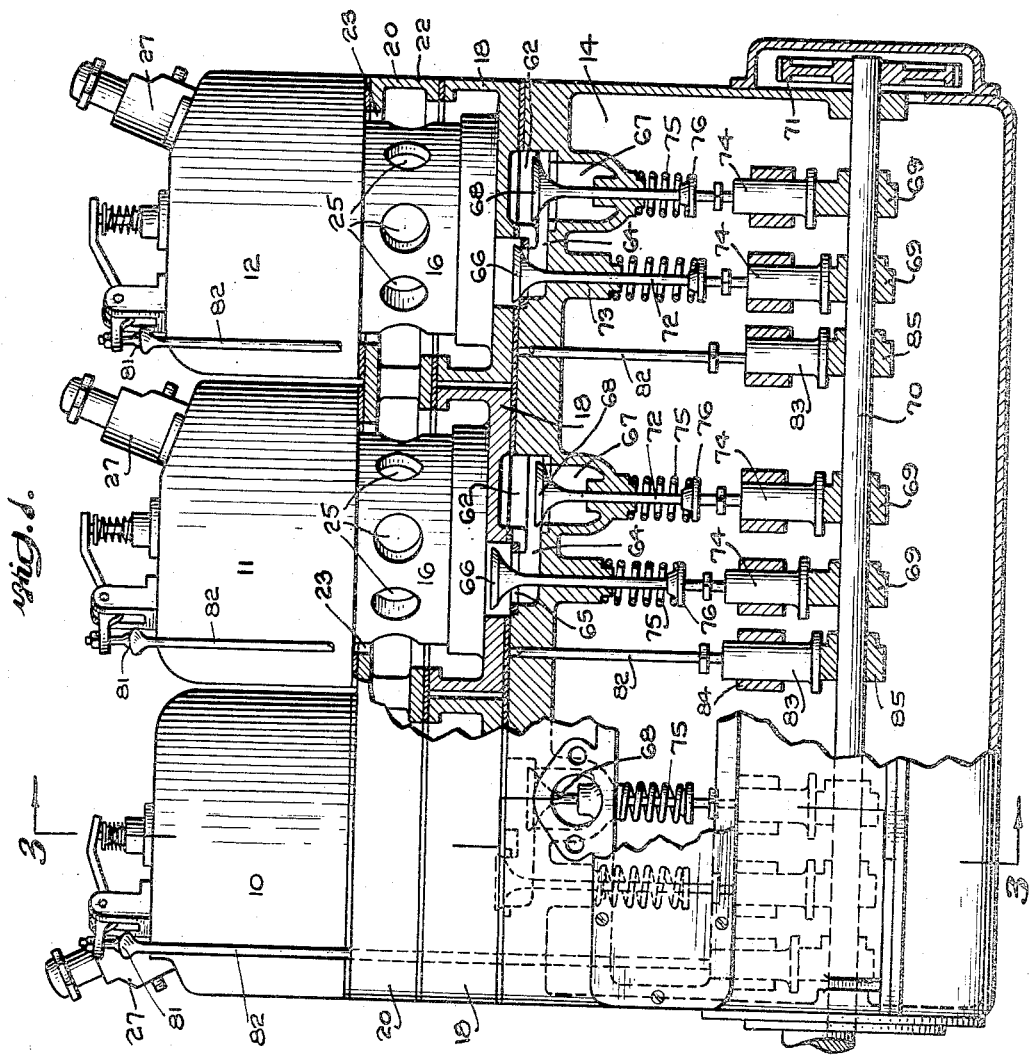
INVENTOR.
HARRY O. HEDGES
BY
*Leon Edelson*
ATTORNEY

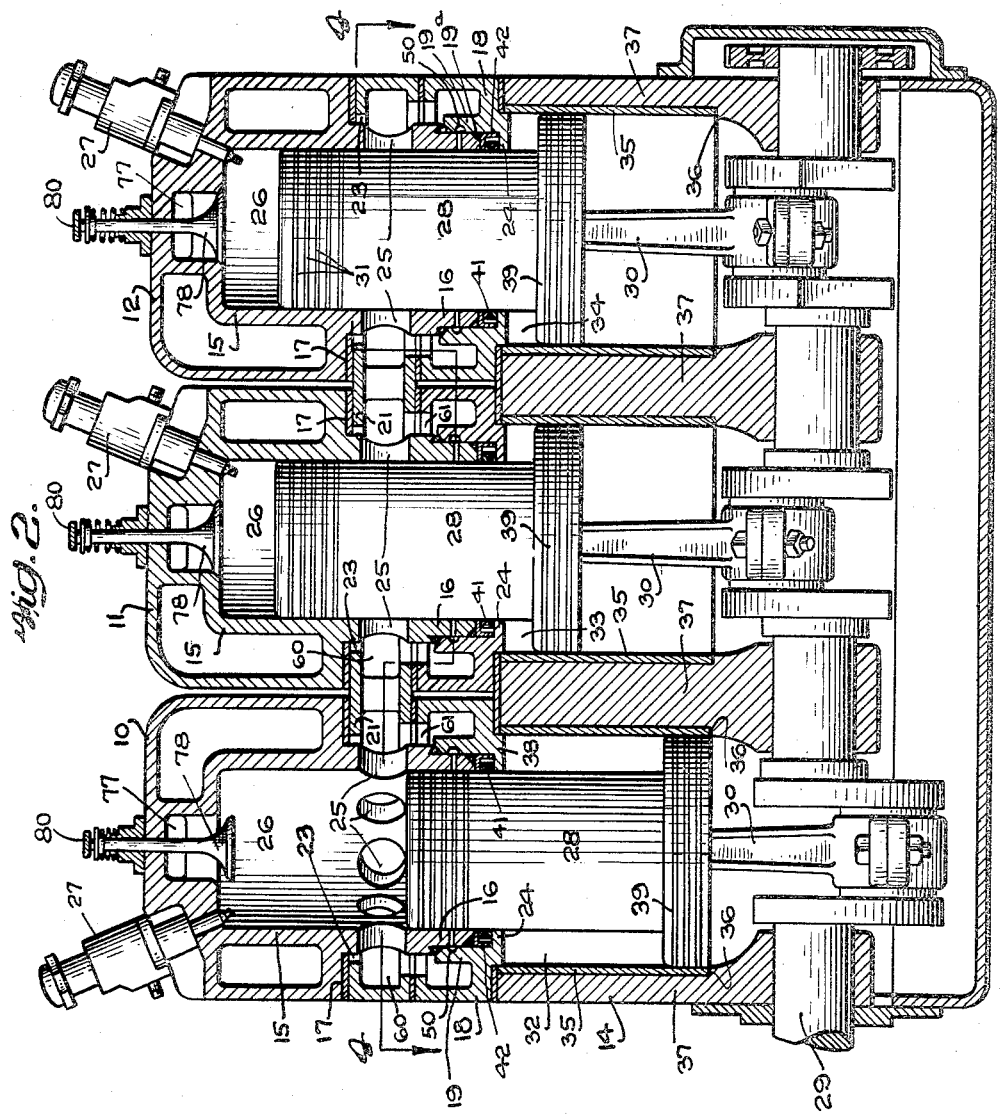

Nov. 8, 1955 H. O. HEDGES 2,722,924
INTERNAL COMBUSTION ENGINE
Filed Feb. 17, 1951 4 Sheets-Sheet 3
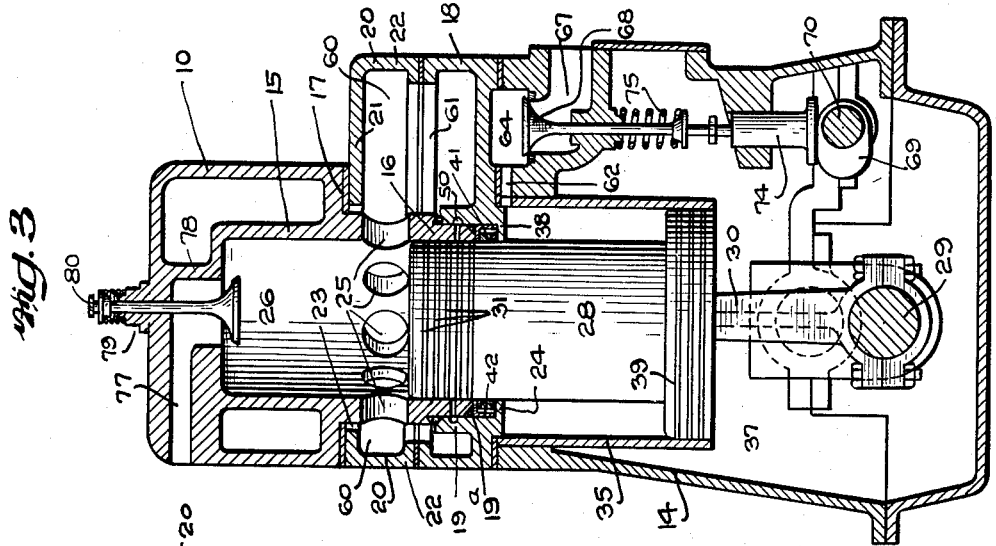
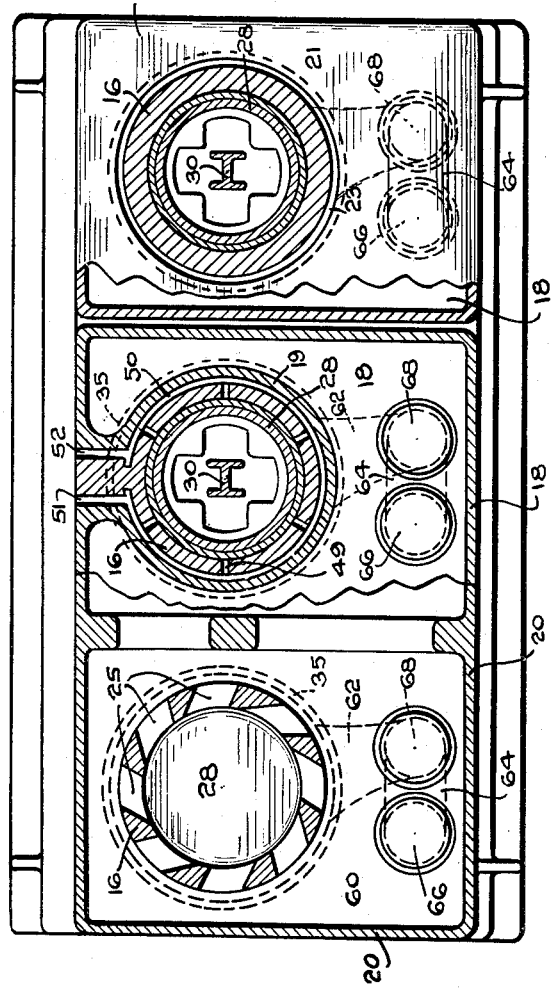
INVENTOR.
HARRY O. HEDGES
BY
*Leon Edelson*
ATTORNEY

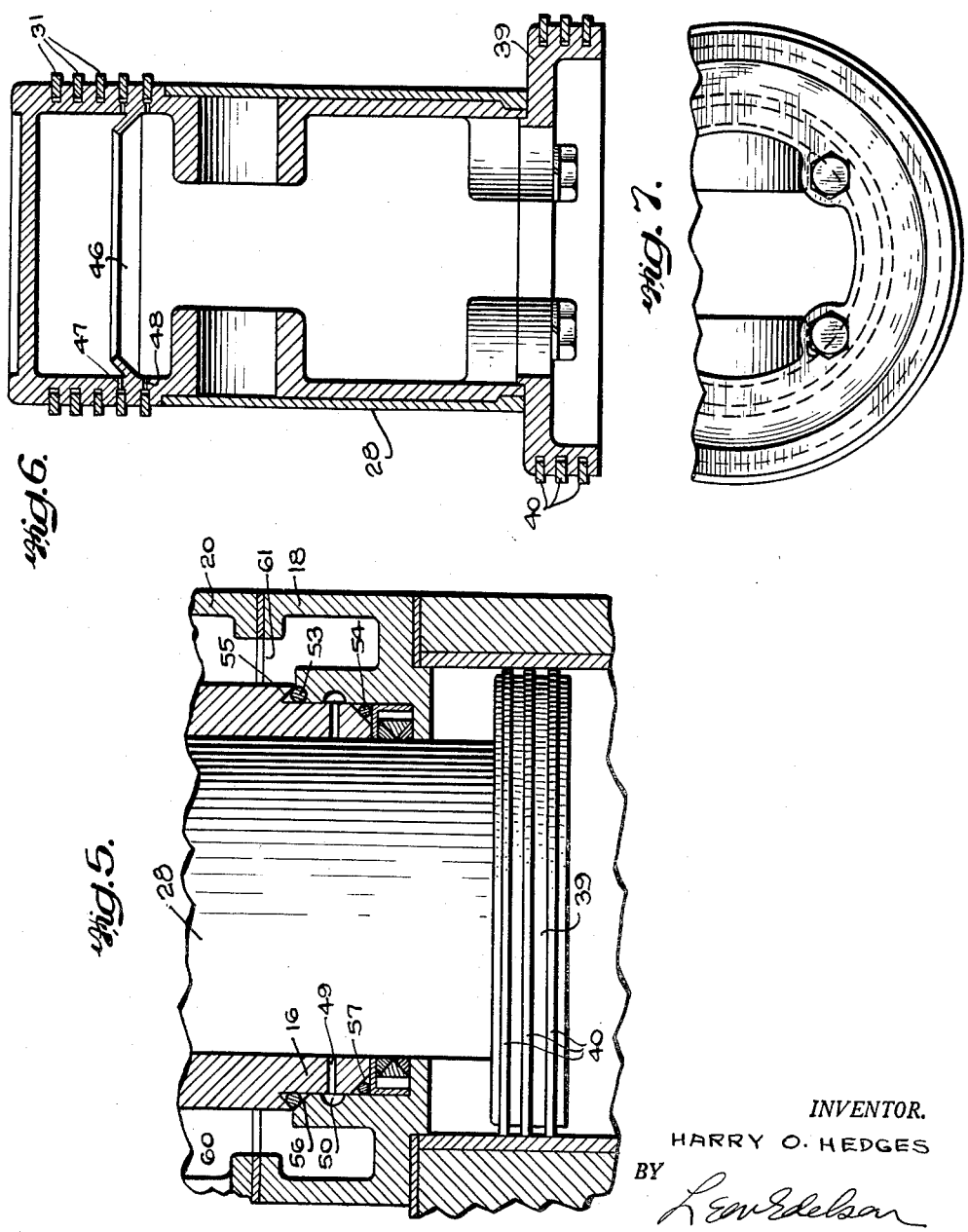

United States Patent Office 2,722,924
Patented Nov. 8, 1955

2,722,924

INTERNAL COMBUSTION ENGINE

Harry O. Hedges, Seattle, Wash., assignor to Hedges Motor Company, Seattle, Wash.

Application February 17, 1951, Serial No. 211,549

8 Claims. (Cl. 123—59)

This invention relates generally to internal combustion engines and more particularly to an improved construction of a two-cycle engine having: maximum horsepower output at all ranges of its operating speed; muffling characteristics approaching, if not equaling those of a four-cycle engine; four-cycle engine performance with half of the number of valves, cylinders, pistons and connecting rods normally required for such performance; materially reduced weight per horsepower unit of output; and generally increased efficiency of operation.

Among the principal objects of the present invention is to provide a novel construction of multicylinder internal combustion engine, e. g., a diesel engine, having a built-in automatic pressure system for the gaseous supply to the engine, which system is operative for the scavenging of burnt gases and which insures complete exhaust of such gases from the combustion chamber of each cylinder of the engine immediately upon completion of each power stroke of the piston operating within said cylinder, the general construction and arrangement of the engine and its component parts being such as to insure positive (pressure) delivery to the combustion chamber of successive charges of the expansible gaseous medium in amounts sufficient to completely fill the combustion chamber of a given cylinder for maximum power thrust of the piston within said cylinder.

A still further and important object of the present invention is to provide a novel construction of multicylinder two-cycle internal combustion engine wherein the several cylinders and their respectively associated pistons operate in predetermined sequence to maintain constantly available a reservoir of gaseous fuel (in the case of a gasoline engine) or of air (in the case of a diesel engine) which is injected under superatmospheric pressure into the combustion chambers of the several cylinders in the order of their operation, the gaseous fuel or air being supplied to each combustion chamber in an amount and under an initial pressure sufficient to provide an adequate working change to be exploded in the chamber and to insure complete evacuation of all burnt gases remaining therein following explosion of the charge.

Still another and important object of the present invention is to provide an internal combustion engine of the character aforesaid with a manifold which is disposed intermediate separate top and bottom sections of the cylinder block and forms a part of the latter and which serves as a reservoir into which gaseous fuel (in the case of a gasoline engine) or air (in the case of a diesel engine) is pumped by the pistons operating sequentially in the several cylinders of the engine, the manifold being suitably valved to control the introduction under superatmospheric pressure of the gaseous fuel or the air, as the case may be, into the combustion chambers of the several cylinders in accordance with their order of operation. This manifold, which is common to all of the cylinders of the engine, is of such design and construction as to eliminate all tortuous paths of flow of the gaseous medium supplied therefrom to the combustion chamber of each cylinder and so insures a more direct and uniform flow of the medium into each combustion chamber under substantially constant superatmospheric pressure, with resulting increase in efficiency of operation of the engine.

Still another object of the invention is to provide in an internal combustion engine of the character above described a supply manifold which is common to and in direct communication with the combustion chambers of the several cylinders of the engine and which is constantly filled with a supply of the gaseous medium under superatmospheric pressure for introduction into each combustion chamber of the sequentially operating cylinders of the engine, a charge of the gaseous medium being introduced into the supply manifold upon the return or upstroke of each of the several pistons. To this end, each piston is provided at its lower end with an enlarged annular part which fits snugly with a correspondingly enlarged lower extension of the main cylinder to form an auxiliary pressure chamber which is in valved communication with the supply manifold, the enlarged piston part being operative within this auxiliary pressure chamber in the manner of a fluid pressure pump to constantly charge the supply manifold with the gaseous medium which is ultimately delivered into the combustion chambers of the several main cylinders of the engine.

The provision of the above-mentioned supply manifold in association with the auxiliary pressure chambers just referred to obviates one of the principal difficulties inherent in the conventional two-cycle diesel engine, namely, that of effecting complete scavenging of the exhaust gases, especially at high speeds. In the two-cycle engine of the present invention, the scavenging is effected automatically by the auxiliary fluid pressure pump built into the engine as a part thereof and which operates with an expenditure of power less than that absorbed by the so-called auxiliary scavenge pumps conventionally employed in conjunction with two-cycle engines, thereby increasing the operating efficiency of the engine to more closely approach that of the four-cycle engine wherein scavenging is effected by the main piston operating on its exhaust stroke.

A still further novel feature of the present invention is the provision of suitably valved overhead exhaust ports respectively located at the top ends of the combustion chambers of the cylinders. By employing such overhead exhaust ports instead of the conventional cylinder side wall ports, the air inlet ports may be spaced about the full circumference of the cylinder wall and so provide for entry of the scavenging medium uniformly about the full circumference of the combustion chamber, thereby insuring complete and effective scavenging of the burnt gases from the cylinder, in consequence of which the engine of the present construction more nearly approaches the operating efficiency of the ideal two-cycle engine which theoretically should develop twice the power of a four-cycle engine of equal size.

Still other objects and advantages of the present invention will appear more fully hereinafter, it being understood that the present invention consists in the combination, construction, location and relative arrangement of parts, all as will appear more fully hereinafter, as shown in the accompanying drawings and as finally pointed out in the appended claims.

In the accompanying drawings, which illustrate a preferred construction of diesel engine embodying the principles of the present invention:

Figure 1 is a side elevational view, shown partially in section, of a three cylinder, two-cycle engine;

Figure 2 is a vertical sectional view of the engine;

Figure 3 is a sectional view thereof as taken along the line 3—3 of Figure 1;

Figure 4 is a horizontal sectional view as taken along the line 4—4 of Figure 2;

Figure 5 is an enlarged sectional view of a portion of a cylinder and piston assembly with the piston shown at its top dead center position, i. e., at the upper end of its compression stroke;

Figure 6 is a vertical sectional view of the piston assembly per se; and

Figure 7 is a partial bottom plan view of the piston assembly.

Referring now more particularly to the drawings, it will be observed that the internal combustion engine illustrated therein is of the type known as the diesel engine in which the power is derived by gases resulting from the combustion of a pulverized or liquid fuel injected in finely divided state and at high pressure by means of a fuel injection pump into the engine cylinder when the piston thereof is at or near the upper end of its compression stroke, the heat generated by the compression of air in the cylinder being the sole means of igniting the charge for producing the power-developing gases. Although the present invention has been shown as applied to diesel engines, it will be understood that it is equally applicable to other types of internal combustion engines, such as the gasoline engine in which power is derived by explosion of a mixture of gasoline and air in the cylinder when ignited by a spark.

The engine constructed in accordance with and embodying the principles of the present invention is of the multicylinder type and as illustrated includes three closely associated water-jacketed cylinders 10, 11 and 12 suitably mounted upon the upper end of a common crank case 14. As most clearly appears in Figures 1, 2 and 3, each of these cylinders includes a water-jacketed upper body part 15 having a cylindrical depending portion 16 of reduced external diameter to form an annular supporting shoulder 17. Superimposed upon and secured in any suitable manner to the top of the crank case 14 are a plurality of relatively shallow box-like members 18, these members being disposed in coplanar relation and being each internally provided with an upstanding cylindrical part 19 forming a recess 19a in which is received the depending cylindrical end portion 16 of one of the several cylinders 10, 11 and 12. The several members 18 together cover an area which is substantially coextensive with that of the top surface of the crank case, which latter is provided with a plurality of openings in axial registry, respectively, with the recesses 19a of the members 18. Overlying these members 18 is a single member 20, of a perimetral outline generally corresponding to that of the top surface of the crank case, which is cored out to provide it with a solid top 21 and depending marginal flanges 22 which rest upon and are suitably secured to the corresponding marginal edge portions of the several coplanar members 18.

As most clearly appears in Figures 2 and 3, the top 21 of the member 20 is provided with a plurality of openings 23 respectively in registry with the recessed parts 19 of the lower members 18, these openings 23 being each of a diameter sufficient to permit the depending portions of the several cylinders to be freely projected downwardly therethrough for seating engagement of the annular shoulders 17 directly upon the top surface of the upper member 20, in which latter supported position of the cylinders 10, 11 and 12 their bottom extremities are vertically spaced from annular flanges 24 provided at the lower ends of the cylindrical parts 19 formed in the members 18. It will be noted that the inner circular edges of these annular flanges 24 are respectively in axial alinement with the internal cylindrical surfaces of the water-jacketed cylinders and so constitute extensions of such surfaces when the parts are assembled as shown in Figures 2 and 3.

The superimposed members 18 and 20 conjointly form a hollow manifold which commonly embraces the depending portions 16 of the several cylinders, each of which latter is provided with a plurality of circumferentially spaced air inlet openings 25 disposed just below the horizontal plane of the top 21 of the member 20 to provide for free communication between the interior of the manifold and the combustion chamber 26 of each cylinder.

Each of the cylinders 10, 11 and 12 is provided at its closed upper end with a suitable fuel injector nozzle 27 and is fitted internally thereof with a reciprocating piston 28 preferably of the construction described in detail in my copending application, Serial No. 94,368, filed May 20, 1949, these pistons being each connected to the crank shaft 29 of the engine through the intervention of a wrist pin (not shown) and a connecting rod 30. The crank shaft and connecting rod of each piston are splash-lubricated by oil contained in the crank case 14, which oil is carried upwardly by the piston and thence forced outwardly thereof to lubricate the upper reaches of the internal walls of the piston cylinder. The upper ends of the pistons 28 are each fitted with piston rings 31 in accordance with conventional practice.

As most clearly appears in Figures 2 and 3, the crank case 14 of the engine is interiorly provided with a plurality of auxiliary chambers 32, 33 and 34, which are each of greater internal diameter than that of the main power cylinders 10, 11 and 12, these enlarged diameter chambers being, respectively, in such axial registry with the several power cylinders as to constitute in effect enlarged cylindrical extensions of the latter. Preferably, these auxiliary chambers are formed by fitting into the crank case cylindrical members 35 of suitable gauge and diameter with the lower ends thereof seated in shoulders 36 suitably formed in the crank shaft bearing supports 37 constituting rigid parts of the crank case. The upper ends of the several cylindrical members 35 are centered by and snugly embrace circular projections 38 formed on the bottom surface of the lower manifold members 18, these projections being concentric with the annular flanges 24 of the members 18 disposed in coplanar relation immediately above the crank case 14. Thus, the members 18 maintain the several main power cylinders 10, 11 and 12, respectively, in alinement with their associated auxiliary pressure chambers 32, 33 and 34.

The pistons 28, as described in detail in my copending application aforesaid, are each provided at their lower ends with an enlarged portion 39 adapted to fit snugly within the cylinder 35 which forms the auxiliary pressure chamber associated with each main power cylinder, the enlarged portion 39 of each piston being suitably fitted with conventional piston rings 40.

As most clearly appears in Figures 2 and 3, the chambers 32, 33, and 34 are of annular form, each being formed between the concentric walls of the cylindrical member 15 and the upper portion of the piston 28 operating therein. The lower end of each of these annular chambers is sealed by the enlarged portion of the piston fitted with the oil sealing rings 40, while their upper ends are each sealed by a contractile set 41 of sealing rings (see Figure 5) disposed as shown between the lower end of the depending part 16 of each main power cylinder and the annular flange 24 formed on each member 18 at the bottom of the recess 19 in which said cylinder part is received.

It will be noted that each of these sets 41 of contractile sealing rings includes an annular retainer 42 of right angular cross section which is seated as shown upon the annular flange 24 to provide, conjointly with the latter, an annular enclosure for three split-ring elements 43, 44 and 45 each of generally triangular form. The central element 43 of each set of sealing rings is of equilateral triangular cross section and is disposed with its flat base spaced from and in coaxial relation with respect to the main upper body portion of the piston 28. The two outer elements 44 and 45 of each splitring assembly are each of right angle triangular cross section and are arranged with their hypotenusal surfaces respectively in engagement with the opposite side surfaces of the central element 43. All of the splitring elements 43, 44 and 45 are contractile in action, with the central ring 43 preferably having greater contractile tendency than the outer rings. By virtue of their relative arrangement and design the central ring 43 acts as a circumferentially extending wedge between the outer pair of rings 44 and 45 tending to force the latter inwardly of the cylinder and into such snug engagement with the piston as to provide a gaseous tight seal between the piston and its cylinder sufficient to hold compression of the gaseous medium both in the combustion chamber 26 and in the auxiliary compression chamber of each cylinder during all positions of the piston reciprocating in the cylinder.

Because of this gaseous and fluid tight seal between the piston and the lower end of the reduced diameter section of the cylinder, passage of lubricating oil from the crank case upwardly between the inner wall of the cylinder and the piston is effectually precluded, and, consequently, it becomes necessary to provide some means for lubricating the internal wall of the main power cylinder. This lubrication is effectively accomplished by the provision internally within the piston of an upwardly inclined annular baffle element 46 which operates in conjunction with oil passages 47 extending through the piston wall and spaced circumferentially thereabout to force the oil outwardly of the piston upon each upstroke thereof, the oil so forced externally of the piston being returned to its interior by way of auxiliary oil passages 48 spaced circumferentially about the piston wall along a line just below the bottom of the annular baffle element 46. This construction of piston for automatically effecting lubrication of the internal reaches of the main cylinder in which the piston operates is described more fully in my aforesaid copending application Serial No. 94,368, and accordingly further detailed description of this feature is not included herein.

If desired, pressure lubrication of the internal reaches of the cylinder to supplement that afforded by operation of the piston itself may be obtained by providing the depending cylindrical portion 16 of each cylinder with a series of circumferentially spaced oil passages 49 the outer ends of which are commonly in communication with an annular groove 50 formed in the internal wall of the recess 19 which is provided in each member 18 for reception of said cylinder part 16. The groove 50 is provided with an inlet port 51 and with an outlet port 52 (see Figure 4) which are in suitable communication with a pump (not shown) for maintaining a constant circulation of oil under pressure within the groove 50 for the supply of oil therefrom into the interior of the cylinder by way of the oil passages 49.

When such pressure circulation of oil is employed, it is desirable to seal the assembly of each cylinder part 16 within its associated manifold member 18 by upper and lower compressible annular gaskets 53 and 54, the gasket 53 being compressed upon assembly of the parts between an annular undercut 55 formed in the external surface of the cylinder part 16 and an annular beveled surface 56 formed in the upper end of the cylindrical part 19 of the manifold member 18, while the gasket 54 is compressed between the top of the sealing-ring retainer 42 and the annular beveled surface 57 formed in the lower end of the cylinder part 16.

Referring now more particularly to the superimposed members 18 and 20, it will be noted that they are all of generally hollow construction and are so assembled as to conjointly form a hollow manifold assembly the interior of which is common to the combustion chambers 26 of the several cylinders 10, 11 and 12 by way of the air inlet openings 25 formed in the walls of the latter at an elevation just below the top wall 21 of the upper manifold member 20. As most clearly appears in Figures 2 and 4, this upper manifold member 20 provides a downwardly opening chamber 60 which is substantially coplanar with the air inlet openings 25 of the several cylinders, this chamber being commonly in communication with the hollow interiors of the underlying manifold members 18 by way of openings 61 formed in the top walls of the latter, these latter openings being disposed in a plane just below the cylinder air inlet openings 25 and being each of a dimension considerably greater than the external diameter of the cylinder part 16 which projects downwardly through the opening 61. Thus, air or gaseous fuel introduced into the hollow interiors of the manifold members 18 is free to pass through the top openings 61 thereof into the interior of the upper manifold member 20 and thence into the combustion chambers 26 of the power cylinders when the inlet openings 25 thereof are uncovered by the reciprocating pistons.

The interiors of the several manifold members 18 are, respectively, in communication with the auxiliary compression chambers 32, 33 and 34, such communication being effected in each instance by way of a passage 62 extending laterally from the top of each compression chamber through the wall of its cylinder 35 and the adjoining top wall portion of the crank case to a relatively short by-passing passage 64 also formed in the top wall portion of the crank case, the remote end of this by-pass 64 being in turn in communication with the interior of the manifold member 18 by way of an opening 65 which is adapted to be opened and closed by a cam-actuated valve 66.

The outer end of the lateral passage 62 is in communication with atmosphere (or any other suitable supply of air in the case of a diesel engine, or gaseous fuel in the case of a gasoline engine) by way of a passage 67 formed in the crank case casting (see Figures 1 and 3), the outer end of which is freely open for intake of the air or gaseous fuel, while the inner end thereof is provided with a valve seat for a cam-actuated valve 68.

It will thus be apparent that each cylinder unit of the engine is provided with an air-intake valve 68 and with an air-by-passing valve 66, each of which is designed for operation in timed relation to movement of the particular piston with which it is immediately associated. In the present instance, each valve is actuated by means of a cam 69 which is keyed or otherwise suitably secured to a cam shaft 70 which is geared, as at 71, to the crank shaft 29 for operation in timed relation thereto. It will be noted that the several cams for operation of the intake valves 68 are angularly related 120 degrees apart so as to provide for proper sequential operation thereof, the cams for operation of the by-passing valves 69 being similarly angularly spaced in relation to one another. Further, the several actuating cams for the intake and by-passing valves are so designed as to effect substantial simultaneous closing and opening of each pair thereof when the piston of the cylinder with which they are associated is at its top dead center and at its bottom dead center positions. At all other times the paired intake and by-passing valves of a given cylinder operate reversely with respect to each other, the one being open when the other is closed and vice versa.

Thus, upon the downward or power stroke of a piston in a given cylinder its associated intake valve 68 is alone open to permit air to be drawn into the auxiliary compression chamber which forms the lower extension of said cylinder, and, conversely, upon the return or up stroke of the piston the by-pass valve 66 associated therewith is alone open to permit forcing of the air out of the compression chamber and into the manifold chamber from whence it is introduced into the combustion chamber or chambers of those power cylinders wherein the pistons are in position to uncover the air intake openings 25.

The several valves 66 and 68 are each provided with an elongated stem 72 which is suitably supported and guided within a bored bearing 73 formed as an integral part of the crank case, the lower ends of these stems being each fitted with a cam shoe 74 which is axially fitted within a guide suitably fixed in the crank case. The cam shoes 74 are each maintained in spring-pressed engagement with the valve-actuating cam 69 by means of a coiled compression spring 75 embracing the valve stem with its opposite ends respectively abutting the valve stem guide bearing 73 and a suitable abutment 76 fixed on the stem. Thus, the normal bias of the springs 75 is such as to tend to maintain the valves closed.

Each of the power cylinders 10, 11 and 12 is provided with an overhead exhaust port 77 which opens directly into the top of the combustion chamber 26 of the cylinder, this port being fitted with a cam-actuated closure valve 78 which is adapted to be opened and closed in predetermined time relation to operation of the piston in the cylinder. Each of these valves 78 is provided with an elongated stem 79 suitably supported and guided in the cylinder head with its outer end in engagement with the inner end of a fulcrumed lever 80, the outer end of which is swivelly connected, as at 81, to a vertically shiftable rod 82 having a cam shoe 83 fitted on its lower end. This cam shoe 83, which is guided for movement within a suitable guide 84 fixed in the crank case, is in engagement with a cam 85 fixed to the cam shaft 70.

As in the case of the intake valves 68 and the by-passing valves 66, the several cams 85 for actuating the exhaust valves are angularly adjusted 120 degrees apart to provide for the desired sequential operation of these valves in proper timed relation to operation of the pistons in their cylinders. It will be noted that the cams 85 are operative to open the exhaust valves for scavenging of the burnt gases immediately upon completion of the power stroke and to hold them open during substantially all of the period that the air intake openings 25 remain uncovered by the piston. The stems of the exhaust valves 78 are fitted with compression springs, as in the case of the intake and by-pass valves, so as to impart to each exhaust valve a normal bias tending to maintain it closed.

The exhaust valve 78 of a given cylinder is, of course, fully open when the cylinder piston is at bottom dead center, as shown in Figure 3, and is fully closed when the piston is at its top center position. The timing of the exhaust valves is such that each exhaust valve of a cylinder commences to open when the piston of that cylinder has completed its effective power stroke, which occurs when the piston has moved through approximately 100 degrees of its full down stroke. As the piston continues its downward stroke to uncover the intake ports 25 of the cylinder, the exhaust valve becomes fully open and remains open until the piston on its return stroke again masks the ports 25, at which instant the exhaust valve re-closes.

In operation of the engine of the present invention as a diesel engine, air from atmosphere or from any other suitable source of supply is drawn into each of the auxiliary chambers 32, 33 and 34 of the several cylinder units by way of the air intake passage 67 upon each down stroke of the piston in its cylinder, the paired intake and by-pass valves for a given cylinder being respectively opened and closed during such down stroke of the piston in the cylinder. Inasmuch as the several cylinders of the engine operate in timed relation, their operation being 120 degrees apart in the case of a three-cylinder engine as shown, all of the cylinders operate to successively draw air into their respective auxiliary compression chambers for ultimate discharge of the air from said chambers into the hollow interior of the manifold which is common to all of the cylinders. To this end, as the piston in a given cylinder commences its return stroke, the by-pass valve 66 associated with that cylinder opens to permit the discharge of air from the compression chamber into the manifold. Thus, the enlarged piston portion 39 operating within its cylinder 35 acts as a pump to intermittently deliver a charge of air under superatmospheric pressure into the manifold by way of the communicating passages 62 and 64 and the by-pass valve opening into the manifold interior.

The manifold is thus suitably filled with air under superatmospheric pressure and serves as a reservoir from which such air is directly and immediately supplied into the interior of the cylinder combustion chamber 26 by way of the air intake openings 25 when the latter are uncovered by the piston operating in a given cylinder. The air entering under pressure into the combustion chamber forces out of said chamber the burnt gases, the latter discharging, of course, by way of the then open exhaust port. As the fresh supply of air displaces the burnt gases, it is compressed within the combustion chamber 26 by movement of the piston 28 on its return stroke, the heat generated by such compression of air in the combustion chamber resulting in ignition of the charge of fuel oil which is injected in atomized state into the combustion chamber by way of the fuel injection nozzle 27 at approximately the instant when the piston in the cylinder is at its top dead center. The ensuing explosion of the working charge causes the piston to move downwardly on its power stroke, during which movement the enlarged lower portion of the piston 39 again operates in its cylinder 35 to draw air into the auxiliary compression chamber for discharge into the manifold, as above described.

Scavenging of the burnt gases from the piston chamber of each cylinder following explosion of the working charge therein is effectually obtained by the superatmospheric pressure of the air which is supplied to the interior of the combustion chamber from the manifold, which latter constantly provides a reservoir of such air which is immediately available for introduction into the combustion chambers as the air intake ports 25 thereof are uncovered by the pistons operating in the cylinders. In addition to the scavenging action of the air thus introduced into each combustion chamber following explosion of the working charge therein, there is a certain amount of self-evacuation of the burnt gases from each cylinder by way of the overhead exhaust valve thereof due to the fact that such exhaust valve is timed to open somewhat ahead of the unmasking of the air intake ports 25 on the downward stroke of the piston in a given cylinder.

As has been previously indicated, the internal combustion engine of the present invention may also be operated as a gasoline engine, in which latter case the fuel injection nozzles 27, as shown, would be replaced by spark plugs or other suitable devices for igniting a gaseous fuel mixture introduced into and compressed within the combustion chambers of the several cylinders. In such case, the gaseous fuel mixture is introduced from any suitable source of supply (not shown) by way of the intake valves 68 and their respectively adjoining passages 62 into the several auxiliary compression chambers in exactly the same manner as air would be introduced into such chambers in the case of a diesel engine, the gaseous fuel mixture being then pumped into the manifold to provide a reservoir of such gaseous fuel under superatmospheric pressure which is constantly available for direct and immediate introduction into the combustion chambers of the several cylinders as the intake ports 25 thereof are unmasked by the pistons operating therein. In all other material respects the construction of the engine when used as a gasoline engine would be the same as when used as a diesel engine.

It will be understood, of course, that the engine of the present invention is susceptible of various changes and modifications which may be made from time to time without departing from the general principles or real spirit of the present invention, and it is accordingly intended to claim the same broadly, as well as specifically, as indicated in the appended claims.

What is claimed as new and useful is:

1. In a multicylinder internal combustion engine, a plurality of operatively associated power cylinders each having a main combustion chamber and an auxiliary compression chamber arranged in axially spaced relation, said auxiliary chamber being of enlarged diameter as compared with that of the combustion chamber, a piston reciprocable in each cylinder having a main body portion operative within said combustion chamber of the cylinder and an enlarged supplemental portion operative within said auxiliary compression chamber of the cylinder, and a manifold commonly completely encompassing all of the power cylinders, said manifold having a hollow interior adapted to be filled with a gaseous medium supplied thereto under superatmospheric pressure from the auxiliary pressure chambers upon each upstroke of the pistons in their respective cylinders, the hollow interior of the manifold being commonly in communication with the combustion chambers of the several cylinders by way of openings formed in the walls of the latter, said openings being disposed substantially in the plane of the manifold interior and being adapted to be opened to and closed off from the manifold interior by the pistons reciprocating in their respective cylinders.

2. In a multicylinder internal combustion engine, a plurality of operatively associated power cylinders each having a main combustion chamber and an auxiliary compression chamber arranged in axially spaced relation, a reciprocable piston in each cylinder having axially spaced pressure heads respectively operative within the axially spaced chambers of the cylinder, a manifold unit having a hollow interior common to the combustion and compression chambers of the several cylinders, and paired intake and by-pass valves for each cylinder respectively positively operable to control and direct the passage of a gaseous medium from a source of supply thereof into the compression chambers of the several cylinders upon the power strokes of the pistons therein and from the compression chambers into the manifold upon the return strokes of the pistons operating in their cylinders, the manifold being thereby constantly filled with a reservoir of the gaseous medium under superatmospheric pressure for delivery into the combustion chambers of the several cylinders immediately following completion of the power strokes of the pistons therein.

3. In an internal combustion engine as defined in claim 2 wherein each of the cylinder combustion chambers is provided with a series of side wall intake ports all of which open into the interior of said manifold and through which the gaseous medium stored under superatmospheric pressure in the manifold is introduced into the combustion chamber of the cylinder when the piston operating therein moves to uncover said intake ports.

4. In a multicylinder internal combustion engine, in combination, a crankcase having fitted therein a plurality of open ended cylinders arranged with their upper ends disposed substantially in the top plane of the crankcase, a plurality of coplanar members mounted upon the top of the crankcase, said members having internal cylindrical parts coaxial with said cylinders a single member mounted in overlying relation upon said coplanar members and having a multiple apertured top wall vertically spaced from said coplanar members, the apertures in the top wall of said overlying member being respectively coaxial with the cylinders in said crankcase, and a plurality of power cylinders respectively mounted upon said single member and having depending portions projecting axially through the several apertures in the top wall of said single member and into the cylindrical parts of the several coplanar members aforesaid, the said coplanar members and their overlying single member being all internally cored out to conjointly form a manifold having a hollow interior which commonly embraces the depending portions of the several power cylinders, the side walls of said depending portions being each provided with a series of circumferentially spaced openings in communication with the hollow interior of said manifold.

5. In a multicylinder internal combustion engine, in combination, a crankcase having fitted therein a plurality of cylinders arranged with their upper ends disposed substantially flush with the top plane surface of the crankcase, a plurality of power cylinders respectively disposed in axial alinement with said crankcase cylinders, said power cylinders being each of an internal diameter substantially less than that of its axially alined crankcase cylinder, and means interposed between said crankcase cylinders and said power cylinders to hold the same in operative assembled relation with the several power cylinders in axial alinement with the several crankcase cylinders and to constitute the latter enlarged extensions of the power cylinders, said means being in the form of a hollow unit which is substantially coextensive in area with the top plane surface of the crankcase and the interior of which commonly embraces the lower wall portions of the power cylinders which defines the bottom region of the combustion chambers thereof, the wall portions of the power cylinders so embraced by the hollow unit being each provided with a series of circumferentially spaced openings in communication with the interior of the hollow unit.

6. In a multicylinder internal combustion engine, in combination, a plurality of operatively associated power cylinders each having a main combustion chamber and an auxiliary fluid pressure chamber disposed in axially spaced relation, a piston reciprocable in each cylinder and having axially spaced pressure heads respectively operative within the axially spaced chambers of each cylinder, a manifold unit commonly completely encompassing all of said power cylinders, said manifold unit having a hollow interior adapted to receive successive charges of fluid compressed within and discharged from the several auxiliary pressure chambers to provide a reservoir of such fluid under substantial constant pressure for introduction into the combustion chambers of the several cylinders following explosion of the working charge therein.

7. In a multicylinder internal combustion engine, in combination, a plurality of operatively associated power cylinders each having a main combustion chamber and an auxiliary fluid pressure chamber disposed in axially spaced relation, a piston reciprocable in each cylinder and having axially spaced pressure heads respectively operative within the axially spaced chambers of each cylinder, a manifold unit commonly completely encompassing all of said power cylinders, said manifold unit having a hollow interior adapted to receive successive charges of fluid compressed within and discharged from the several auxiliary pressure chambers to provide a reservoir of such fluid under substantial constant pressure for introduction into the combustion chambers of the several cylinders following explosion of the working charge therein, said combustion chambers being each provided with a plurality of circumferentially spaced intake ports commonly in communication with the interior of said manifold unit, said ports being masked and unmasked solely by the piston reciprocating in its power cylinder in full control of said parts and being open to passage of fluid from the manifold into the combustion chamber of a given cylinder following completion of the power stroke of the piston in said cylinder and for a period sufficient to fill the combustion chamber with a fresh working charge of the fluid.

8. In a multicylinder internal combustion engine, in combination, a crankcase having a plurality of cylinders extending downwardly into the interior of said crankcase, a plurality of power cylinders respectively disposed in axial alinement with said crankcase cylinders, said power cylinders being each of an internal diameter substantially less than that of said axially alined crankcase cylinder, and means interposed between said crankcase cylinders and said power cylinders to hold the same in operative assembled relation with the several power cylinders in axial alinement with the several crankcase cylinders and to constitute the latter enlarged extension of the power cylinders, said means being in the form of a hollow unit the interior of which commonly embraces the lower wall portions of the power cylinders which define the bottom region of the combustion chambers thereof, the wall portions of the power cylinders so embraced by the hollow unit being each provided with a series of circumferentially spaced openings in communication with the interior of the hollow unit.

References Cited in the file of this patent

UNITED STATES PATENTS

| Number | Name | Date |
|---|---|---|
| 533,922 | Rider et al. | Feb. 12, 1895 |
| 719,547 | Willoughby | Feb. 3, 1903 |
| 895,194 | Radcliffe | Aug. 4, 1908 |
| 966,972 | Wiebe | Aug. 9, 1910 |
| 967,250 | Scholes | Aug. 16, 1910 |
| 1,079,622 | Willoughby | Nov. 25, 1913 |
| 1,218,132 | Tuhey | Mar. 6, 1917 |
| 1,301,661 | Grandville et al. | Apr. 22, 1919 |
| 1,513,190 | Smith et al. | Oct. 28, 1924 |
| 1,688,767 | Webb | Oct. 23, 1928 |
| 1,805,670 | Miller | May 19, 1931 |
| 1,871,820 | Morton | Aug. 16, 1932 |
| 2,426,613 | Jackson | Sept. 2, 1947 |

FOREIGN PATENTS

| Number | Country | Date |
|---|---|---|
| 1,797 | Great Britain | Feb. 6, 1886 |